(12) United States Patent
Clark

(10) Patent No.: US 9,033,841 B2
(45) Date of Patent: May 19, 2015

(54) WINDOW TREATMENT OPERATING APPARATUS WITH CYCLOIDAL DRIVE

(71) Applicant: RollEase Inc., Stamford, CT (US)

(72) Inventor: Christopher D. Clark, Lempster, NH (US)

(73) Assignee: ROLLEASE, INC., Stamford, CT (US)

( * ) Notice: Subject to any disclaimer, the term of this patent is extended or adjusted under 35 U.S.C. 154(b) by 178 days.

(21) Appl. No.: 13/747,688

(22) Filed: Jan. 23, 2013

(65) Prior Publication Data

US 2013/0244824 A1 Sep. 19, 2013

Related U.S. Application Data

(60) Provisional application No. 61/589,912, filed on Jan. 24, 2012.

(51) Int. Cl.
*F16H 3/70* (2006.01)
*E06B 9/42* (2006.01)
*E06B 9/50* (2006.01)
*E06B 9/56* (2006.01)
*F16H 1/32* (2006.01)

(52) U.S. Cl.
CPC .. *F16H 1/32* (2013.01); *E06B 9/42* (2013.01); *E06B 9/50* (2013.01); *E06B 9/56* (2013.01)

(58) Field of Classification Search
USPC .................................. 475/178, 162; 160/321
See application file for complete search history.

(56) References Cited

U.S. PATENT DOCUMENTS

| | | | |
|---|---|---|---|
| 3,135,369 A | 6/1964 | Nisenson et al. | |
| 3,920,106 A | 11/1975 | Nisenson | |
| 4,372,432 A | 2/1983 | Waine et al. | |
| 4,433,765 A | 2/1984 | Rude et al. | |
| 6,685,592 B2 | 2/2004 | Fraczek et al. | |
| 6,739,373 B1 * | 5/2004 | Liu et al. | 160/321 |
| 6,745,812 B1 | 6/2004 | Liu et al. | |
| 6,935,401 B2 | 8/2005 | Fraczek et al. | |
| 7,387,150 B2 * | 6/2008 | Liu | 160/321 |
| 2007/0107857 A1 | 5/2007 | Wang | |
| 2009/0258752 A1 | 10/2009 | Bohlen et al. | |

FOREIGN PATENT DOCUMENTS

IT 0930491 A1 1/1995

OTHER PUBLICATIONS

International Search Report issued in the counterpart PCT/US13/22841, ISA/US, Mar. 22, 2013.

* cited by examiner

*Primary Examiner* — Sherry Estremsky
(74) *Attorney, Agent, or Firm* — Gottlieb, Rackman & Reisman, P.C.

(57) ABSTRACT

An apparatus for selectively activating a window treatment includes an input member, such as a pulley activated by a bead chain, an output member such as a sleeve activating a mandrel, a stationary guard for mounting the window treatment and a rotor. The rotor, pulley, and stationary base are coupled to form a cycloid drive, wherein rotation of the pulley causes the rotor to precess with respect to the pulley.

11 Claims, 15 Drawing Sheets

WINDOW TREATMENT OPERATING APPARATUS WITH CYCLOIDAL DRIVE

RELATED APPLICATIONS

This application claims priority to U.S. Provisional Application Ser. No. 61/589,912 filed Jan. 24, 2012 and incorporated herein by reference in its entirety.

BACKGROUND OF THE INVENTION

A. Field of Invention

This invention relates to window treatment operating apparatus including a bi-directional drive, and, more particularly, to a cycloidal drive providing rotation of an output member in either direction at a predetermined mechanical advantage in response to rotation from an input member while resisting rotational forces from the output member. The input member is preferably a pulley operated by a beaded chain and the output member includes a sleeve supporting and rotating a mandrel of window treatment.

B. Description of the Prior Art

Roller shades are often used as window treatment and provide both a practical and an aesthetic function. Typically, a roller shade includes a tubular mandrel and a decorative panel wound on the mandrel. The mandrel can be selectively rotated by a user either in one direction or the other causing the panel to be either raised or lowered, depending on how it is wound on the mandrel. The roller shade is provided at its two ends with mounting means so that it can be mounted on a window frame or other similar location, using suitable brackets. Normally, one end of the roller shade is a simple rotatable coupling that allows the roller shade to rotate with respect to the bracket. The other end is provided with a bi-directional clutch that provides a mechanical advantage during the operation of the roller shade. Bi-directional clutch mechanisms of this type are disclosed in U.S. Pat. Nos. 4,433,765, 4,372,432 and 6,685,592, all incorporated herein by reference. These references disclose clutch mechanisms in which the mechanical advantage is developed between a pulley and a small shaft. One or more springs are also provided as a means for locking the mandrel to prevent undesirable rotation. Other clutch mechanisms are also known which are based on frictional braking. U.S. Pat. Nos. 3,135,369 and 3,920,106 also disclose bi-directional clutches useable for roller shades.

Recently there has been an increased need for roller shades having larger sizes and/or weights which in turn require stronger clutch mechanisms with a larger mechanical advantage, normally requiring more space. However, in the existing roller blinds, since mechanical advantage is dependent on the relative diameters of a pulley and a small shaft, and since the shaft has already been minimized, the mechanical advantage can be increased by increasing the size of the pulley. However, this is not a practical solution because space is too limited to accommodate a larger pulley, and in addition, a larger pulley may not be esthetically acceptable.

In addition, a stronger clutch mechanism requires more springs for locking the roller blind to prevent its undesirable rotation. However, more springs complicate the structure of the clutch mechanism, and increase the force required to operate the same.

U.S. Pat. No. 6,685,592, also incorporated herein by reference, discloses a clutch mechanism incorporating planetary gears as a means of developing a mechanical advantage. However, planetary gears require several parts that have to made with very precise dimensions. These gears are more expensive to make and assemble thereby adding significantly to the cost of the clutch. Furthermore the mechanical advantage obtainable with such mechanisms may not be sufficient for all purposes.

Many other window dressings, such as awnings, also rely on a rotating mechanism for activation.

SUMMARY OF THE INVENTION

Briefly, a window treatment operation control apparatus for operating a window treatment, the apparatus including a guard for supporting an end of the window treatment, said guard being stationary during the operation of the window treatment; an input member selectively activated by a control member; a rotor coupled to said input member; and an output member connected to said window treatment for operating said window treatment when said input member is activated by the control member; wherein said rotor and said guard cooperating with said guard to form a cycloidal drive that transmits rotational motion form said input member to said output member.

In one aspect of the invention, the control member is operable in a first mode to rotate said pulley in a first direction and in a second mode to rotate said pulley in a second direction, and wherein said cycloidal drive is adapted to rotate said output member in corresponding first and second directions respectively.

In one aspect of the invention, the cycloidal drive resists torsional forces from said output member and does not transmit the same to said input member.

In one aspect of the invention, the input member is a pulley having a disc-shaped body and a motion transmission element transmitting rotational motion of said pulley to said rotor.

In one aspect of the invention, the motion transmission element on the pulley is a circular rib disposed in an off-center position with respect to a rotational axis of the pulley.

In one aspect of the invention, the guard includes projections and said rotor includes motion control elements cooperating with said pins to impart a cycloidal motion to said rotor.

In one aspect of the invention, the guard has m projections and said rotor has n control elements where m is larger than n, wherein n and m define the mechanical advantage of the cycloidal drive.

In one aspect of the invention, the input element is a pulley, further comprising a gear disposed between said pulley and said rotor.

In one aspect of the invention, the input element is a pulley, further comprising a first gear coupled to said input element, and a second gear coupled between said first gear and said rotor.

In one aspect of the invention, the input element is a pulley and said output element is a drum, said pulley and said drum being coaxial.

In another aspect of the invention, the input element is a pulley and said output element is a drum, said pulley and said drum having axially offset axes of rotation.

BRIEF DESCRIPTION OF THE DRAWINGS

Further features and advantages of the invention will become apparent upon consideration of the following detailed description of preferred, but nonetheless illustrative embodiments, when considered in conjunction with the following drawings, in which.

DETAILED DESCRIPTION OF THE INVENTION

Figure 1:
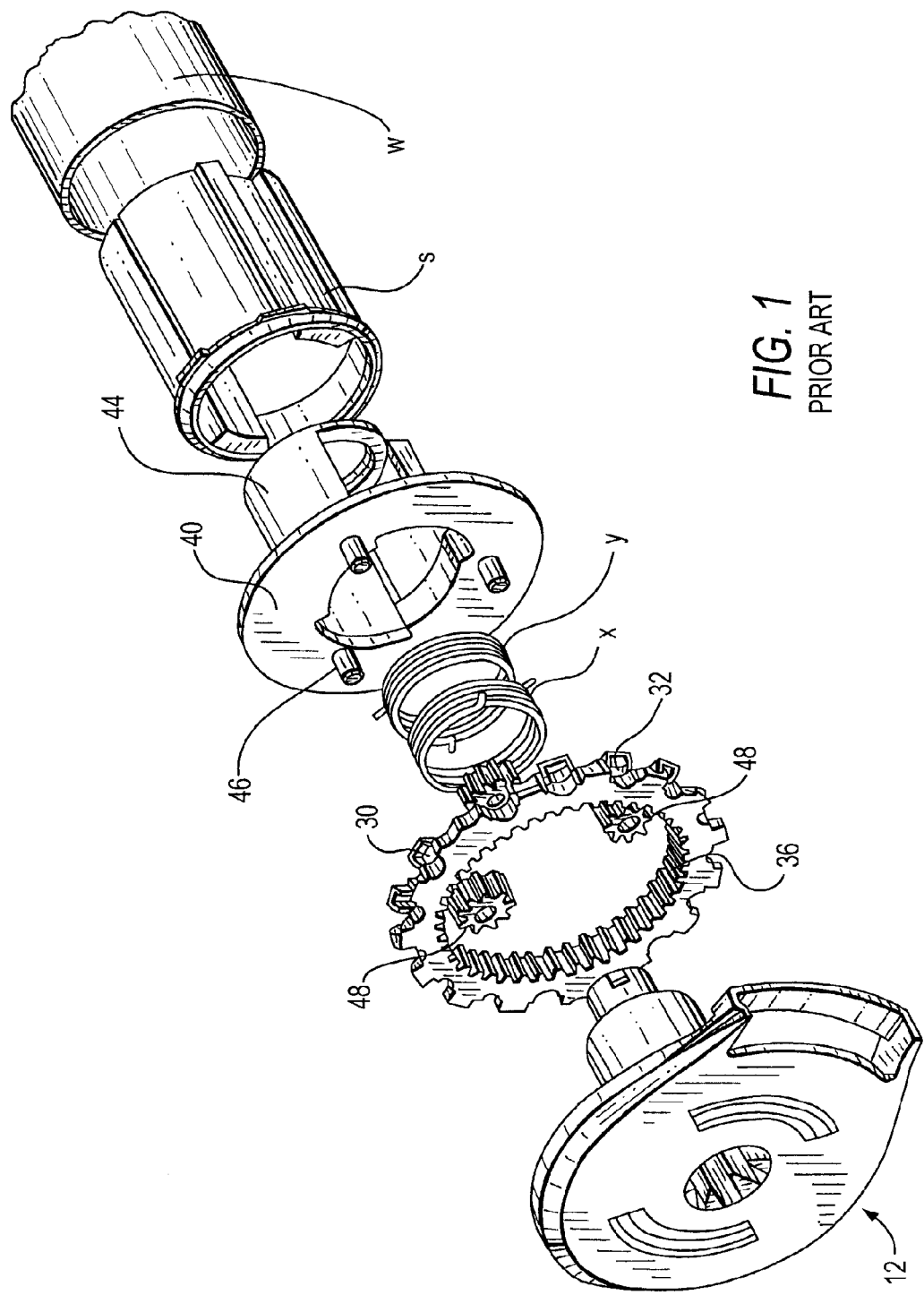
FIG. 1 shows an exploded view of a prior art clutch for a window dressing.

FIG. 1 shows a prior art clutch as described in commonly owned U.S. Pat. No. 6,685,592. The clutch includes a base or guard 12, a ring 30 with a plurality of circumferential pockets 32 and inner circumferential teeth 36, a pair of brake springs X and Y and an output member 40 with a mandrel 44 and a barrel S. The barrel S fits into the mandrel W of a window dressing such as window shade. Different sized and shaped barrels S may be used for different window dressings.

The mechanism further includes a plurality of gears 48 rotatably mounted on shafts 46 of output member 40. Rotation of the ring 30 is transferred at a mechanical advantage by the gears 48 to the output member 40 which then rotates the mandrel W through a barrel S. However, any rotational forces from mandrel W, for example, due to the weight of the window dressing, are opposed by the springs X and Y which act as a brake and stop the output member from rotating.

Figure 2:
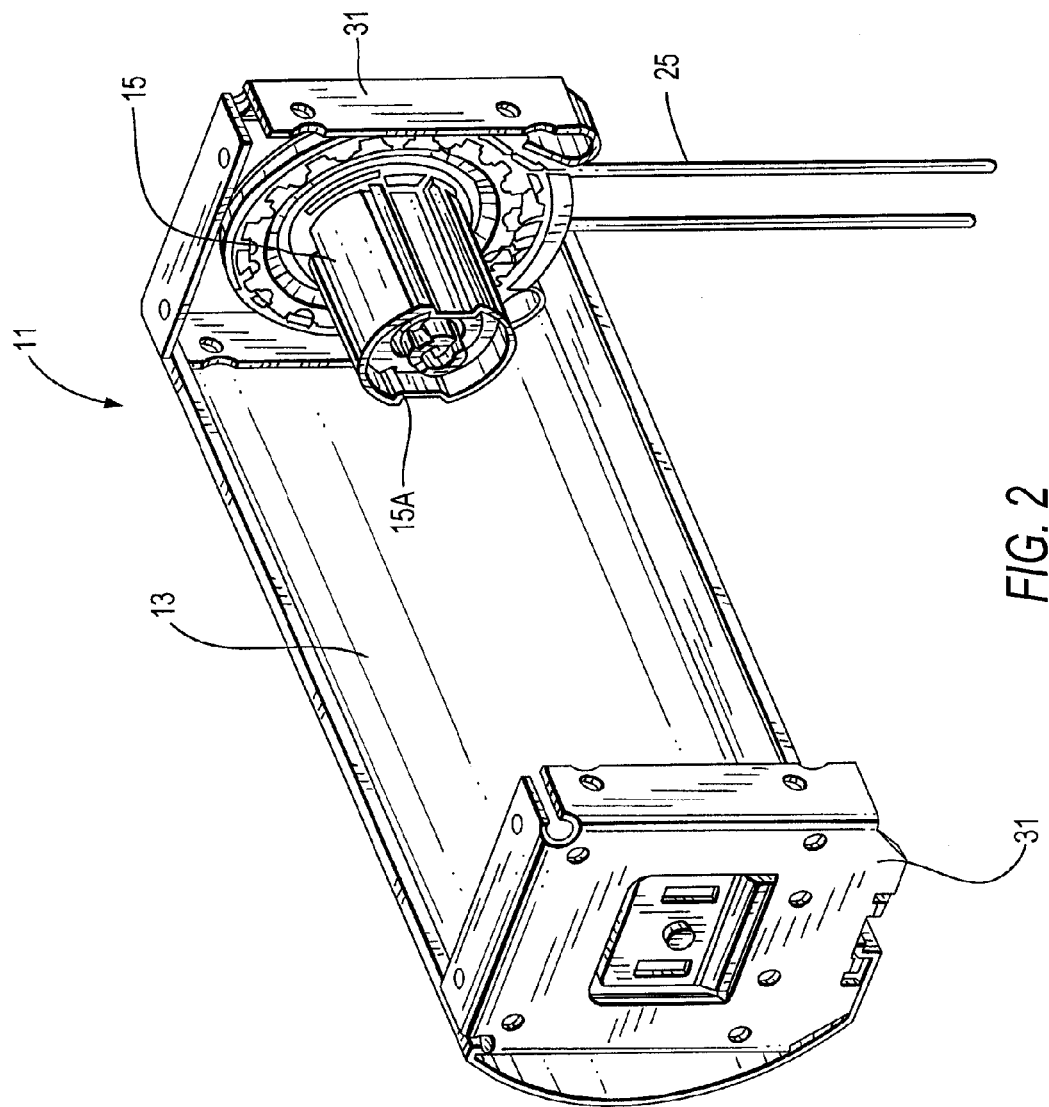
FIG. 2 shows a side elevational view of the present window treatment activating apparatus incorporated into a window treatment.

FIG. 2 shows a window dressing support 11 (as described in more detail in commonly assigned U.S. Pat. No. 6,935,401) including a clutch 15 operated by an elongated chain 25, a headboard 13 and end brackets 31. The window dressing itself has been omitted for the sake of clarity however it has a mandrel which fits over the barrel 15A of clutch 15. Pulling chain 25 causes the barrel 15A of the clutch 15 to rotate in one direction or another thereby raising or lowering the window shade in a known manner. However pulling on the window shade or any other rotational force on the barrel 15A (due, for example, to the weight of the window shade) is resisted by the internal brake of the clutch (e.g., the springs X,Y).

Figure 3:
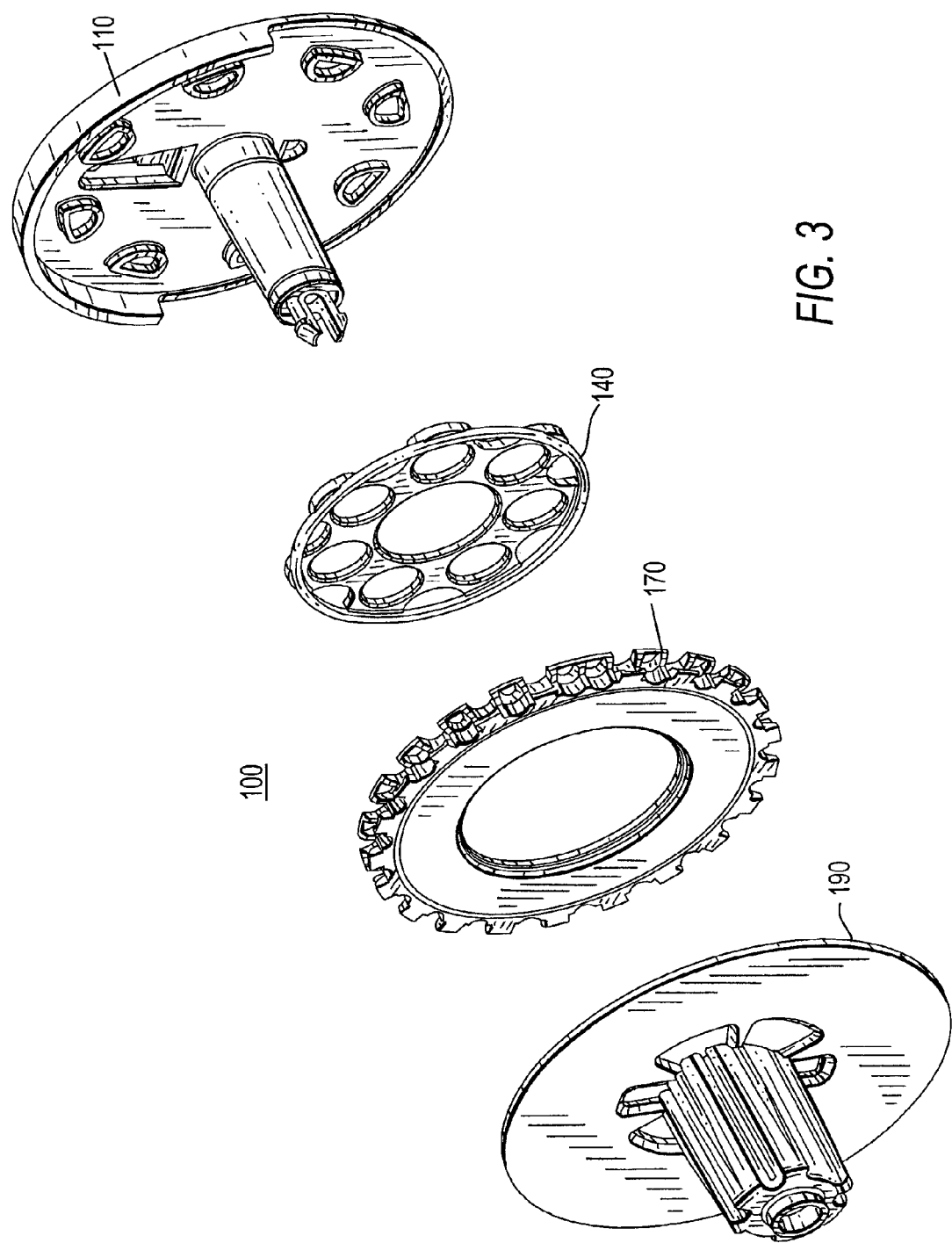
FIG. 3 shows an exploded view of apparatus of FIG. 2.
Figure 4:
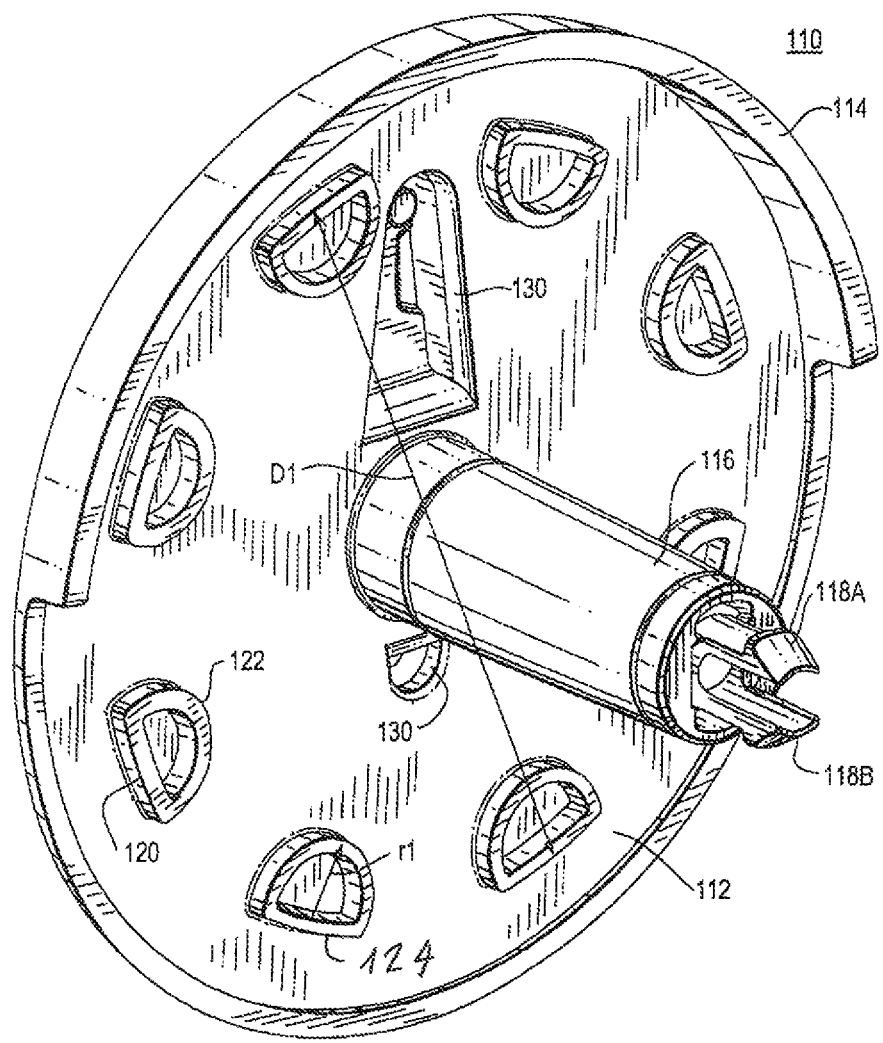
FIG. 4 shows an orthogonal view of the guard.

An improved clutch 100, also referred to herein as a cycloidal drive, that can be used in the dressing support 11 (by replacing clutch 15) is shown in FIGS. 3-10. The clutch 100 includes a stationary guard 110, a rotor 140, a pulley 170 and an output member 190. The guard 110 (shown in more detail in FIG. 4) includes a flat, circular disc 112 with a circumferential wall 114 extending axially as shown. The disc 112 also supports a central boss 116 concentric with disc 112 and terminating with two axially extending fingers 118A, 118B. Also on disc 112 there are a plurality of driving projections 120 disposed at equal distances around the boss 116. In FIG. 3, eight such projections 120 are shown, however, this number may change as discussed in more detail below. Each of the driving projection has an arcuate wall 122 arranged as shown. The walls 122 may be circular with a radius r1 and are oriented axially inwardly toward boss 116. The projections 120 have a radially outward wall 124 as well. Walls 124 are also circular with a radius much larger than the radius r1. Moreover, the walls 124 are arranged on disc 112 to define an imaginary circle having a diameter D1 and concentric with boss 116. Finally, the guard 110 further includes depressions 130 sized and shaped to mount the clutch 100 to a stationary bracket or other support means (not shown). The guard 110 is preferably molded as a single unitary piece and is made a plastic material.

Figure 5:
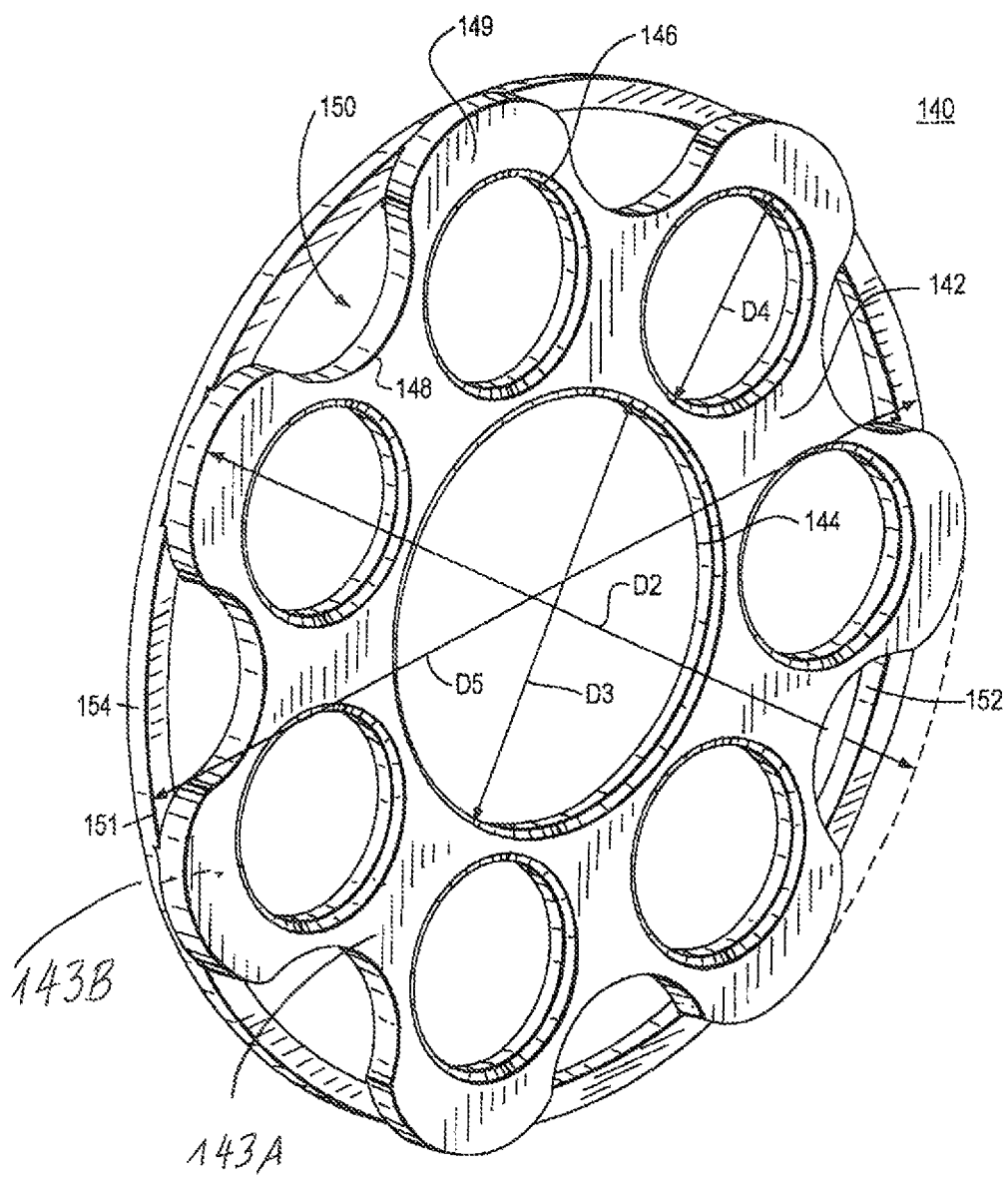
FIG. 5 shows an orthogonal view of one side of the rotor.
Figure 6:
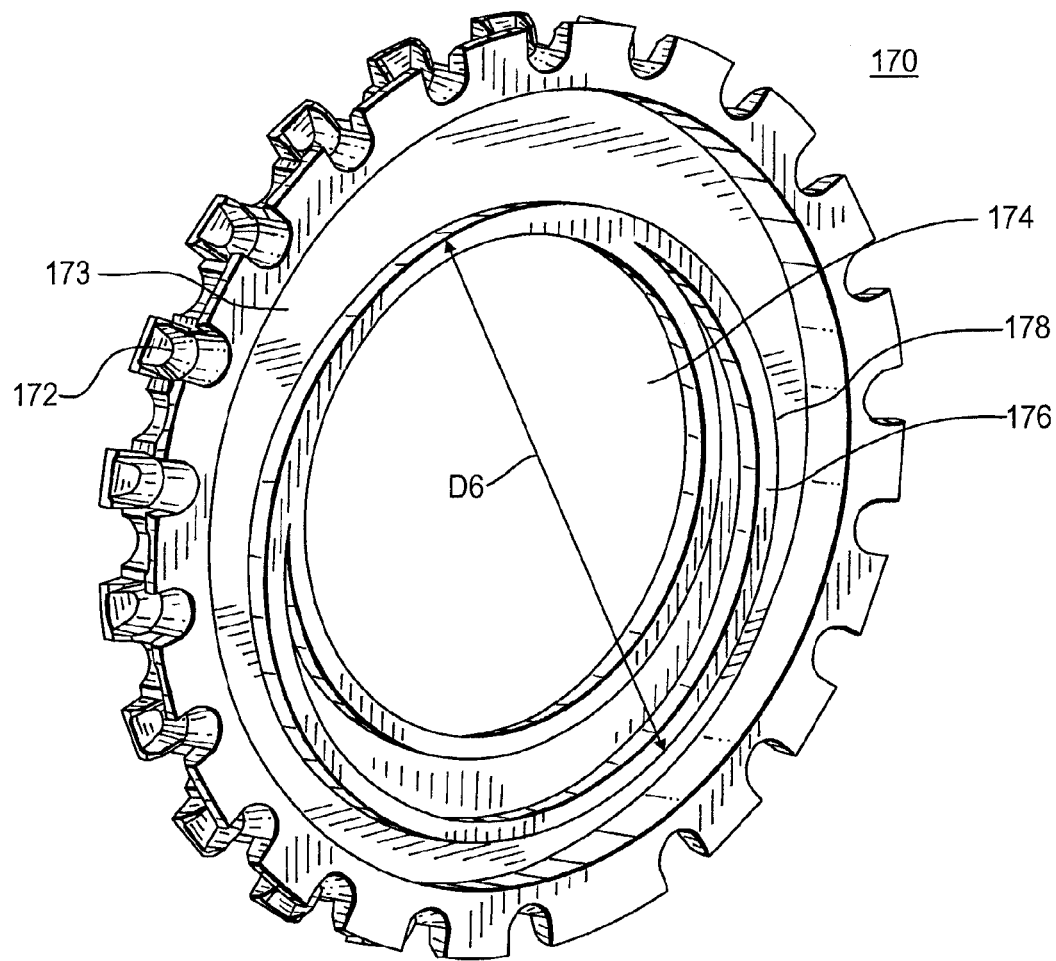
FIG. 6 shows an orthogonal view of one side of the pulley.
Figure 7:
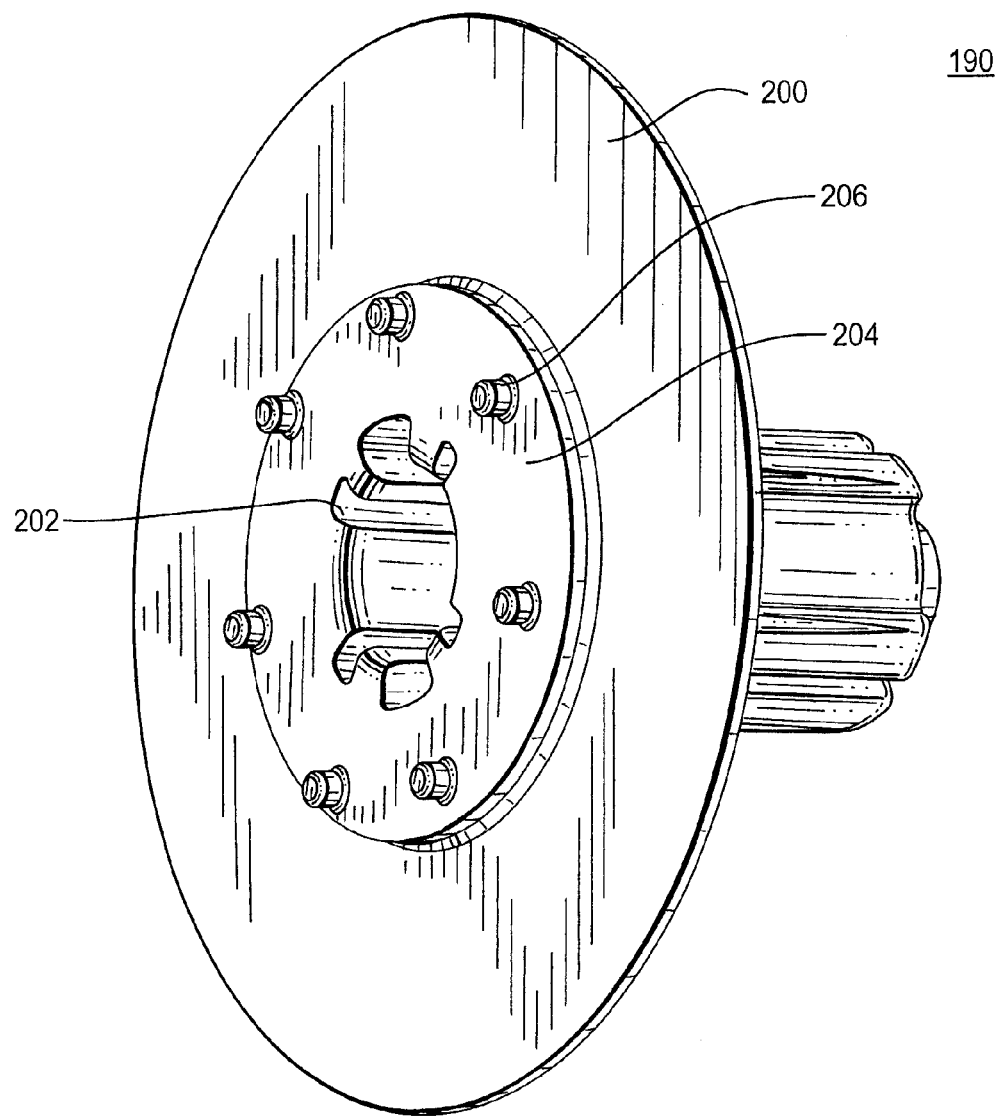
FIG. 7 shows an orthogonal view of the back of the output member.
Figure 8:
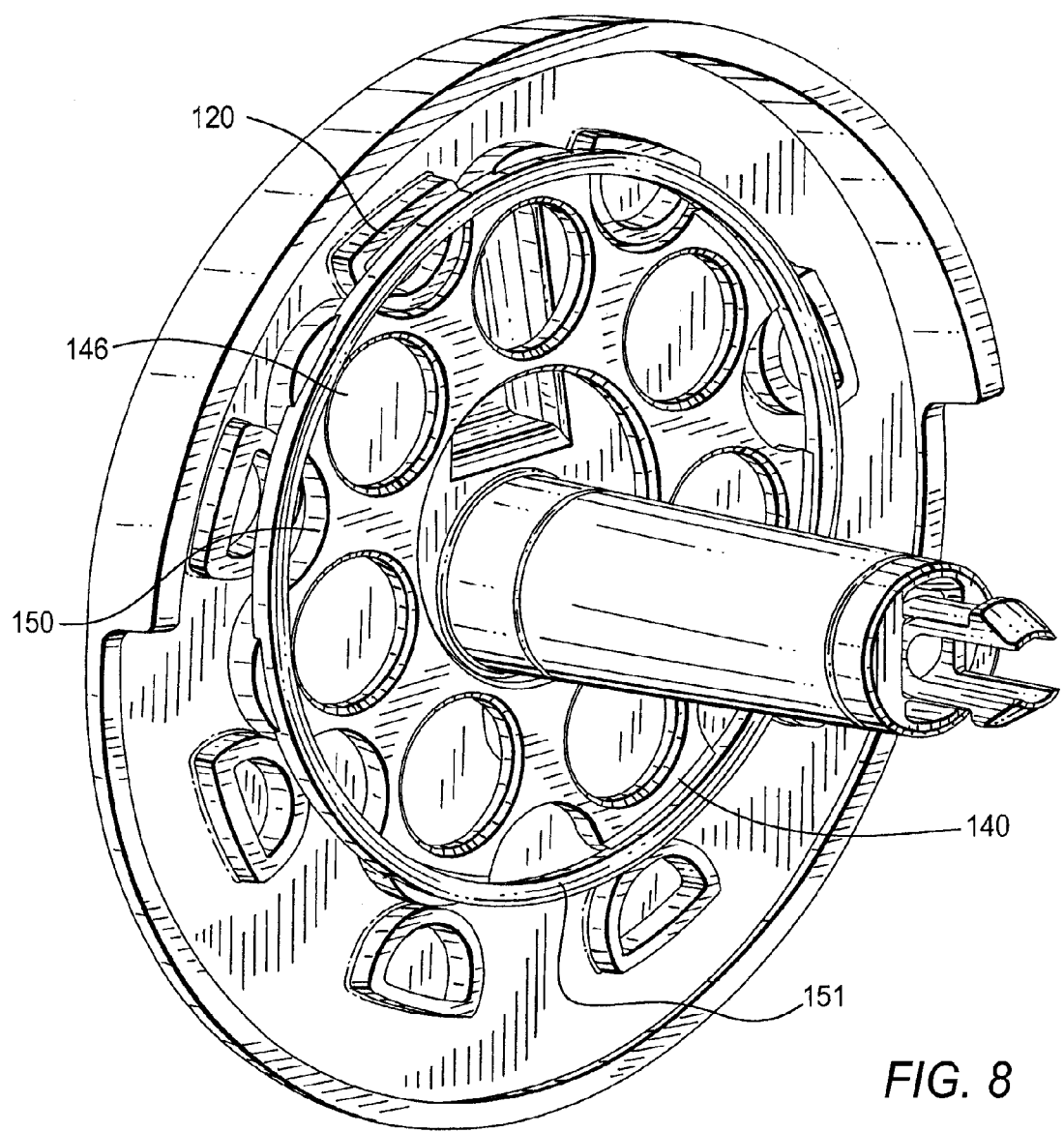
FIG. 8 shows the rotor engaging the guard.

Rotor 140 is disc-shaped and has base 142 with two flat surfaces 143A, 143 B defining its two sides. The base 142 is circular with a diameter D2 (see FIG. 5) that is smaller than D1. The base 142 is formed with a central circular opening 144 disposed concentrically within the base 142 with a diameter D3, and seven smaller circular openings 146 disposed evenly around the central opening 144 and each having a diameter D4. At least between each opening 146, there is an arcuate wall 148 defining lobes 149 therebetween. Preferably walls 148 and lobes 149 have a continuous wave-like curvature defined to provide a cycloidal movement to the rotor. The walls 148 define a cavity 150 receiving one of the projections 120, each having a wall 122 at least partially contacting the wall 148, as shown in FIG. 8. In FIG. 5, rotor 140 is shown with seven lobes 149. The number of lobes 149 and the number of projections 120 define the mechanical advantage of the drive. More specifically, with m projections and n lobes, the mechanical advantage of the resulting drive is m−n/m, in this case 1:8.

As also shown in FIGS. 5 and 8, attached to the base 142 is shaped as an annular ring 151 formed by an inner circular wall 152 and an outer circular wall 154. The inner wall 152 is circular and has a diameter D5.

Figure 9:
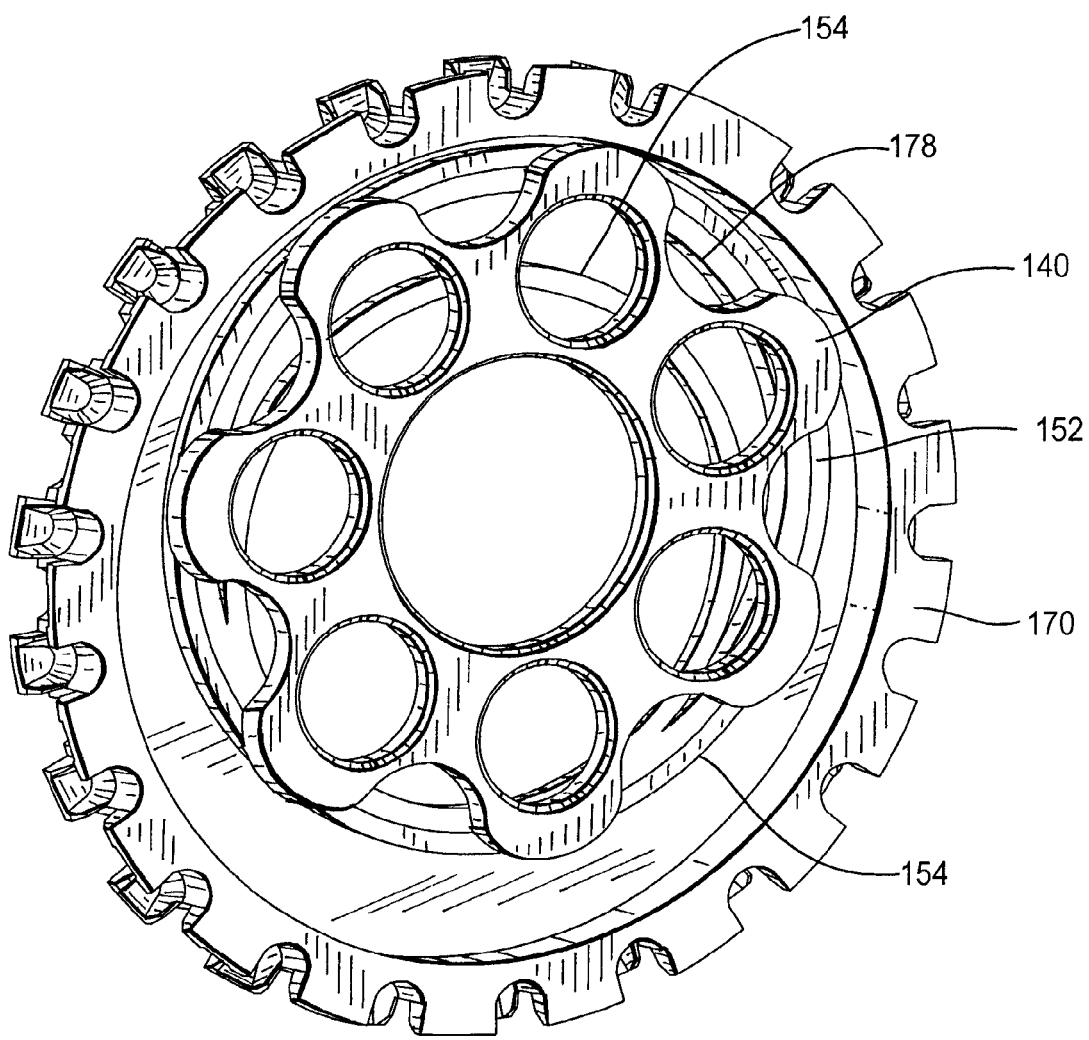
FIG. 9 shows the rotor engaging the pulley.

Pulley 170 is essentially disc shaped with a plurality of outer teeth 172 forming a channel to receive and engage with a conventional operating cord or bead chain (not shown). A circular concentric hole 174 is formed at the center of the pulley 170. On one side 173, the pulley 170 is formed with a circular rib 176 having an outer circular wall 178. Wall 178 is not concentric with the hole 174 or pulley 170 and has a diameter D6 that is equal to, or slightly smaller than D5. As a result, when the pulley 170 is placed adjacent to the rotor 140, the outer wall 178 of rib 176 fits within the inner surface 152 of ring 151 on rotor 140, as shown in FIG. 9.

Figure 10:
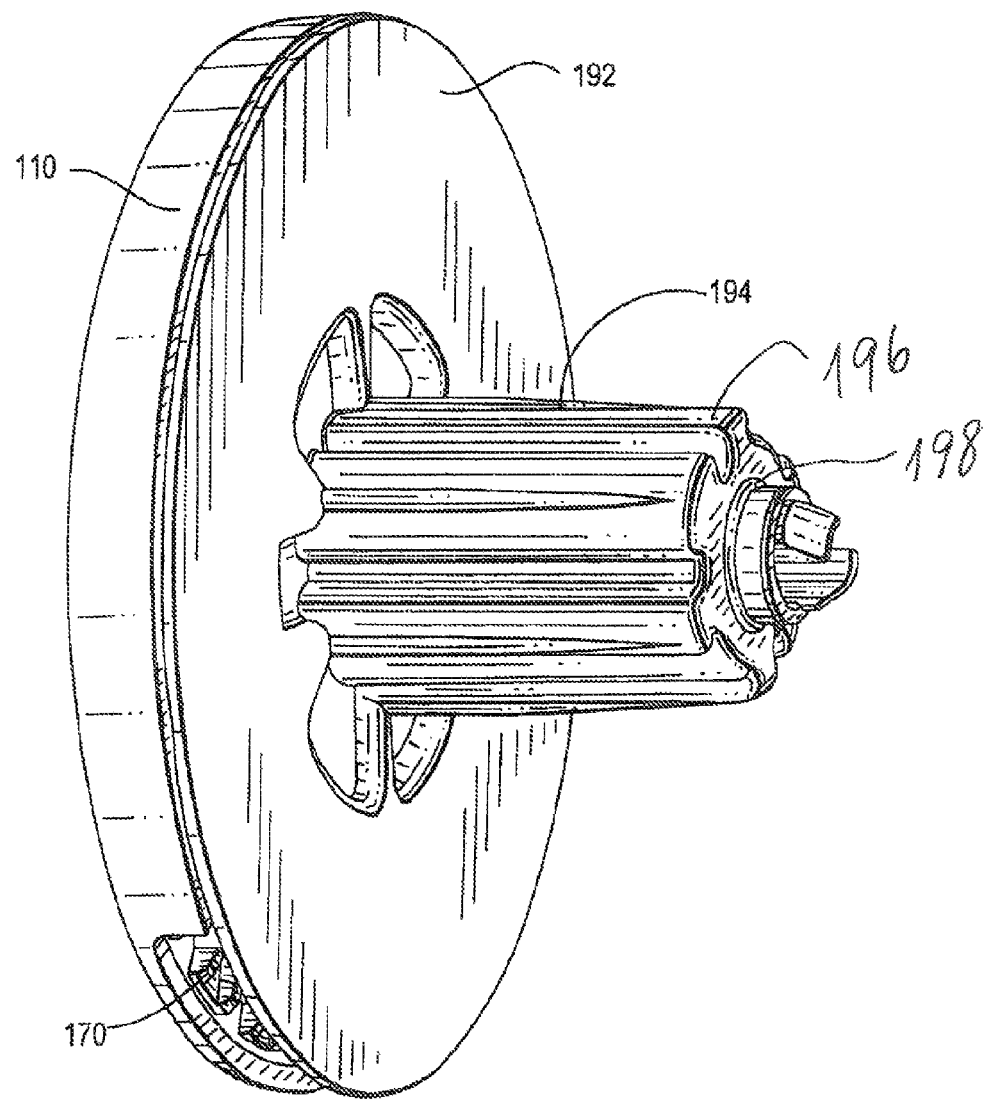
FIG. 10 shows an isometric view of the assembled apparatus.

The output member 190, is the output member, as can be seen in FIGS. 3 and 10. Includes a disc-shaped member 192 and a hollow drum 194. The drum 194 has an outer surface 196 that is essentially cylindrical and is formed to accept and drive the mandrel of a window dressing (not shown). The tip of the drum 194 is formed with a concentric circular hole 198.

On the side 200 opposite the drum 184, the member 190 is formed with a central cavity 202 extending through drum 194 extending to hole 198. The side 200 is further provided with a circular concentric platform 204 with seven pins 206 extending axially. The platform 204 has a diameter that is equal to or slightly smaller than the diameter of hole 174 of pulley 170.

The clutch is assembled by putting the elements just described in the relative positions shown in FIG. 3, with the pulley 170 being mounted rotatably on the platform 204, the rotor 140 mounted with its inner wall 152 riding on the wall 178 of the pulley 170 and two or three of its outer walls 148 receiving respective projections 122. A cord or beaded chain is trained around and engages some of the circumference if the pulley 170.

The elements described are pressed together with the boss 116 extending into the drum 194 and the arms 118A, 1188 extending through the hole 198. Preferably the arms 118A, 1188 have slightly enlarged heads so that they can be inserted into and through the hole 198 thereby capturing and holding the elements together. Each of the pins 206 on output member 190 extend through one of the respective holes 146 of the rotor 140. The assembled drive 100 is shown in FIG. 10.

With the possible exception of pins 206, all the elements described can be made of a plastic material by molding or other materials by well-known techniques. At least some of these elements, e.g., the elements that come in contact with each other can be either lubricated or can be made of a self-lubricating material.

The clutch or cycloid drive 100 operates as follows. Pulling the cord or chain in one direction causes the pulley 170 to rotate coaxially around the stationary boss 116. The rotation of the pulley 170 causes the rotor 140 to rotate eccentrically on wall 178 of rib 176 in a precessing motion to contact between successive projections 122 of the guard 110 entering into successive cavities 150 formed by valleys 149 and the sliding contact between walls 178 on the pulley 170 and wall 152 on the rotor 140. It should be noted that since the number of projections 122 are different then the number of walls 156 and the rotor is smaller in diameter then the pulley 170, the pulley 170 and rotor 140 are rotating at different rates. Since each pin 206 extends into a hole 146 of rotor 140, as the rotor 140 rotates, it causes the output member 190 to rotate as well through pins 206. The output member 190 then rotates the mandrel (or other similar elements) of the window dressing in the appropriate direction.

The clutch described herein provides a speed reduction defined by the number of projections on the guard and the number of external surfaces on the rotor. Moreover, the structure of the clutch is such that torque can be transferred inherently from the input member—the pulley—to the output member but not in the other direction.

Figure 11A:
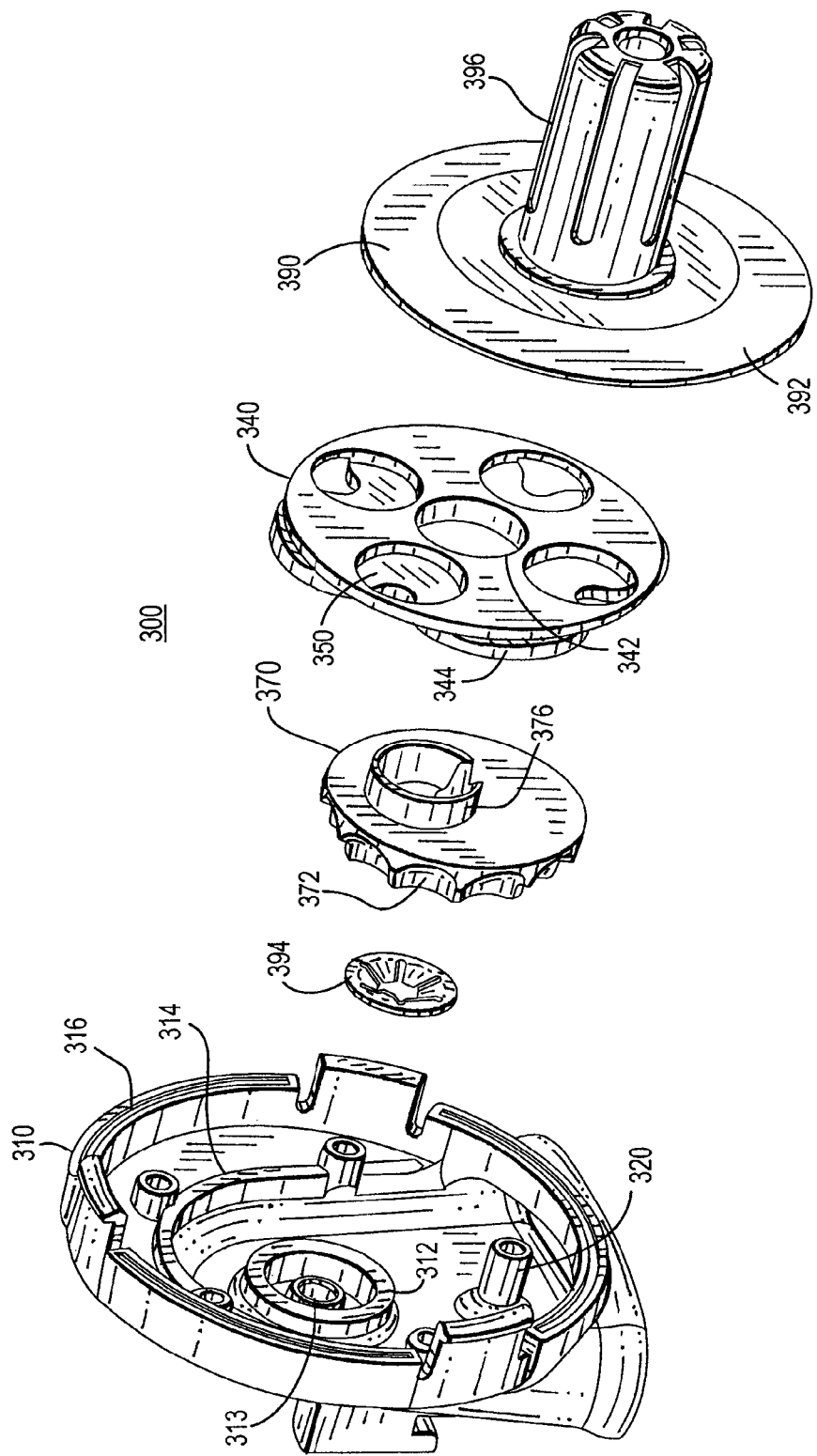
FIGS. 11A, 11B show isometric exploded views of a first alternate embodiment of the invention.
Figure 11B:
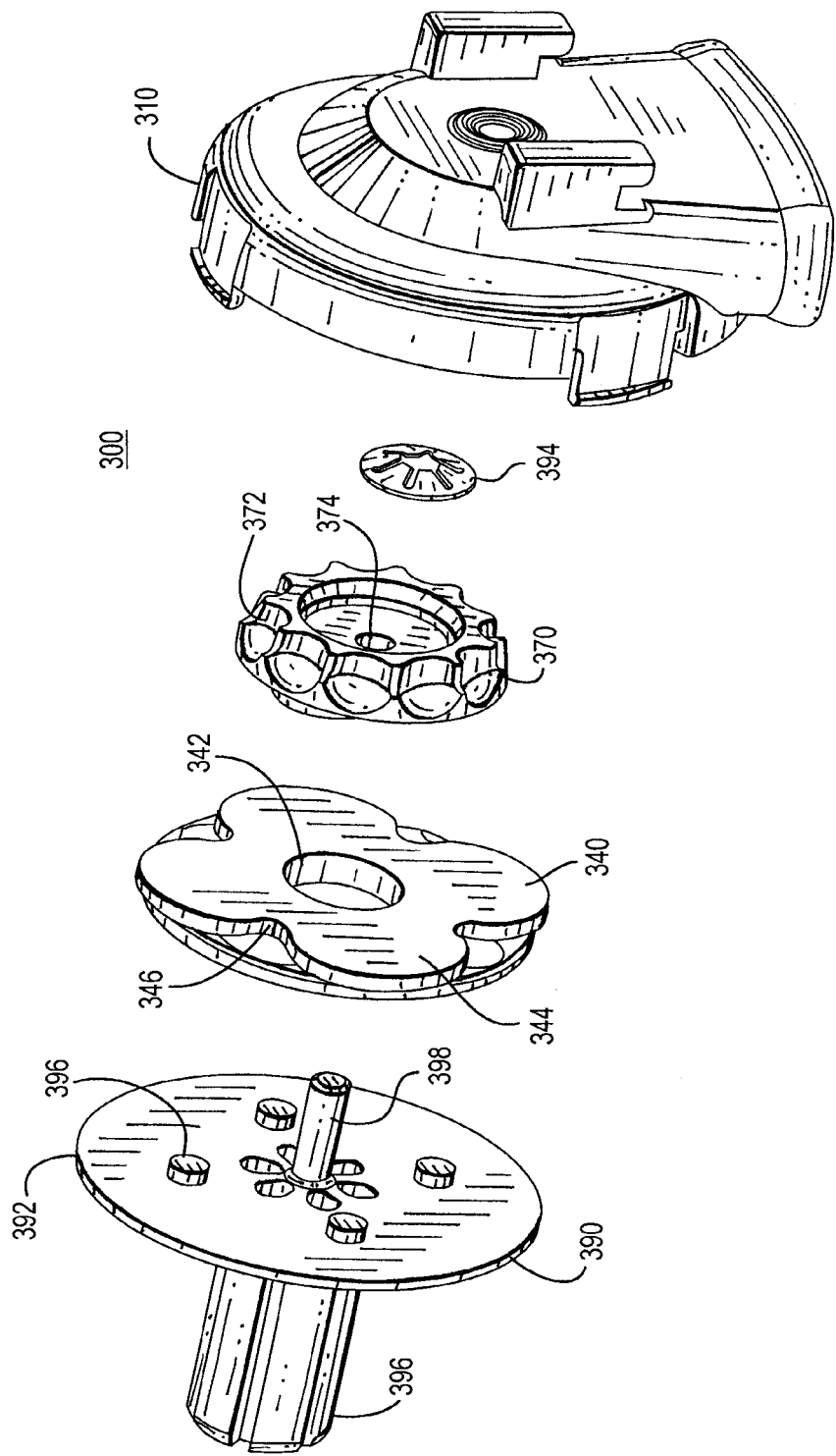

FIGS. 11A and 11B show an alternate embodiment. There are several differences between this embodiment and the embodiment previously described as shall become apparent from the following description. Drive 300 includes a stationary guard 310 that gets mounted on a wall or the frame of a window and supports one end of the window dressing (not shown). The drive 300 further includes a pulley 370, which is the power input member, a rotor 340 and an output member 340. As seen in FIG. 11A, guard 310 is formed with an inner boss 312 formed with a central socket 313, a circular protective wall 314, an outer wall 316, and a plurality of pins 320.

Rotor 340 has on one surface (see FIG. 11B) a central hole 342, and a plurality of lobes 344 forming valleys 346 therebetween. On the other side, the rotor 340 has a plurality of circular holes 350 (FIG. 11B).

Pulley 370 has on one side a plurality of somewhat circular indentations 372 arranged concentrically around a hole 374. On the other side, the pulley 370 has a circular boss 376 that is set at a predetermined distance from the center of pulley 370 and hole 374. The boss 376 is sized and shaped to fit into hole 342 in the rotor 340.

The output member 390 includes a disc 392 and a drum 396 concentric with the disc 392. On the inner side, disk 392 is formed with several pins 394. The pins are sized and arranged to fit through holes 350 of the rotor 340. The disc 390 also includes a central concentric pin 398 long enough to pass through the rotor 340, pulley 370 and enter into hole 313 in guard 310.

Drive 300 is assembled by placing the rotor 340 adjacent to disc 392 with each of the pins 396 being disposed in one of the holes 350, and the pin 398 extending through hole 342. Next, the pulley 370 is placed next to the rotor 370 with the boss 376 entering into hole 372 and pin extending through the hole 374. A Belleville washer 394 is inserted on pin 398 to keep all these parts in place and the parts thus assembled are placed adjacent to the guard 310 with the end of the pin 398 being received by hole 313 and some, but not all the pins 320 contacting the walls of the valleys 346. In the Figures, there are five pins 320 and four lobes 344 and valleys 346. A chain is trained around the pulley 370 and its beads (if any) are engaged by the indentations 372 so that when the chain is pulled in either direction, the pulley 370 turns accordingly around the pin 398. The chain (not shown) is maintained in position by the inner wall 314.

As in the previous embodiment, the drive 300 is a cycloidal drive with the pulley 370 and guard 310 (through its pins 320) causing the rotor 340 to turn off centrically and precessing. The movement of the rotor 340 is transmitted by the walls of holes 350 to pins 396 thereby causing the output member to rotate as well.

The mechanical advantage of this arrangement is 5:1.

Figure 12A:
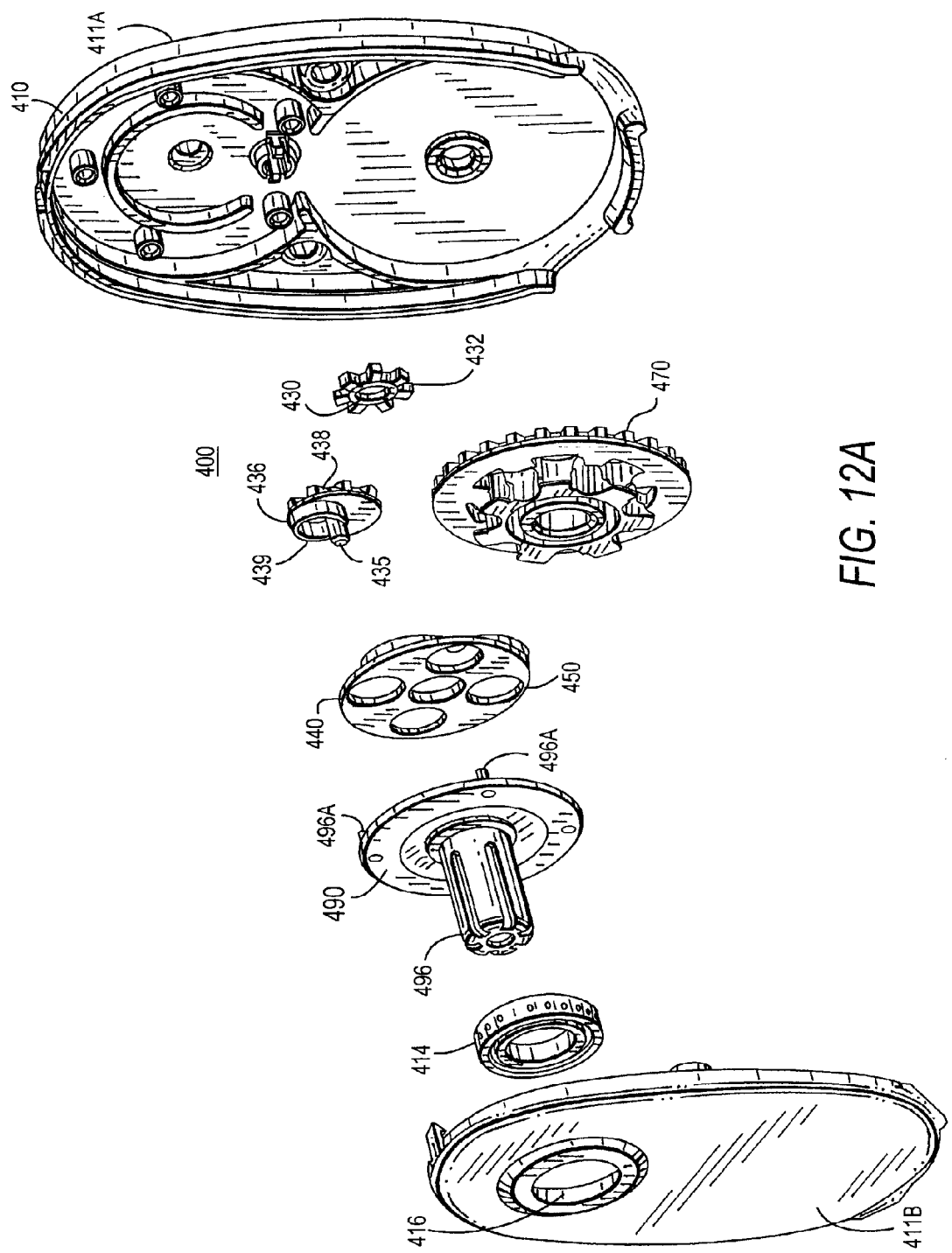
FIG. 12A, shows an isometric exploded view of a second alternate embodiment of the invention.
Figure 12B:
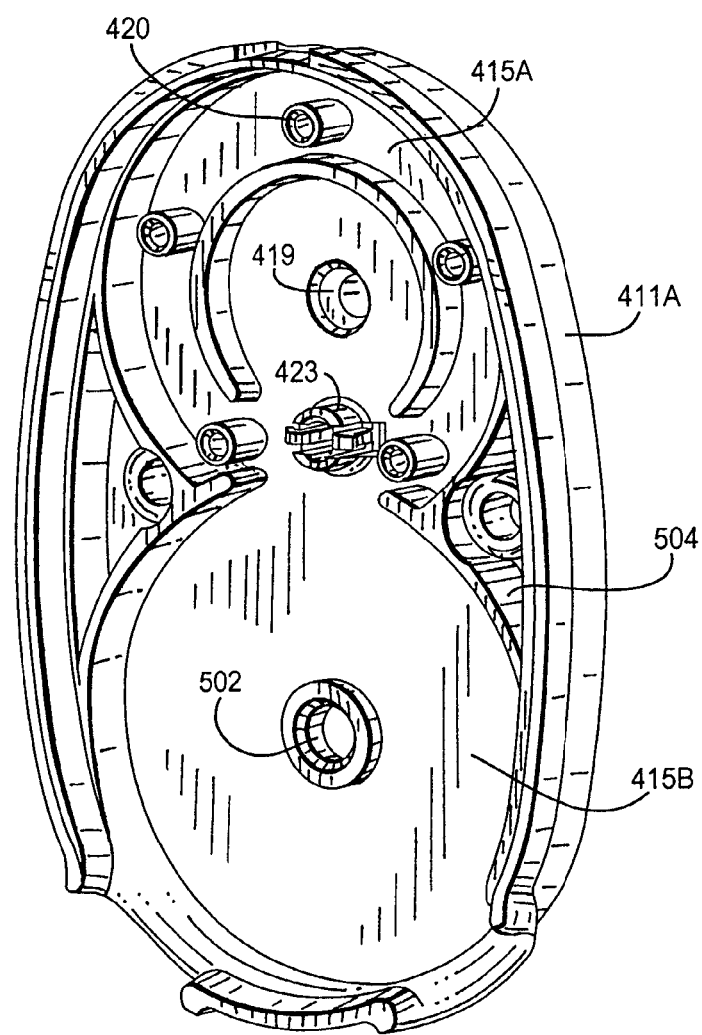
FIG. 12B shows an interior view of the guard of the apparatus of FIG. 12A.

Another embodiment of the invention is shown in FIGS. 12A-12B.

In this embodiment, a drive 400 is provided including a guard having two shells 411A, 411B that close to form a cavity for the remaining element so of the drive. These elements include a first gear 430, a second gear 436, a rotor 440 and an output member 490. The output member 490 and the rotor 440 have the same shape as the corresponding members 390 and rotor 340 described above.

The output member 490 includes a drum 496 with a wheel bearing 414. The drum 496 passes through an opening 416 in shell 411B and the wheel bearing 414 is used to support the drum 496 within this opening 416 Output member 440 also has pins 496A similar to pins 396.

As shown in more detail in FIG. 12B, shell 411A is shaped to define two sections, an upper section 415A and a lower section 415B. The upper section 415A includes five pins 420 having the same structure and function as pins 320 in FIGS. 11A, 11B. An inner wall 417 defines a space for receiving second gear 436, with a shaft 435 supported at one end by a hole 419.

Lower section 415B has a similar hole 502 receiving the end of a shaft (not shown) supporting the pulley 470. The cord or bead chain trained around the pulley 470 is protected by a wall 504.

Between the two sections 415, 415B, a shaft 423 is used to support first gear 430.

Gear 430 is provided with a plurality of standard gear teeth 432 that mesh with similar teeth on the pulley 470 and second gear 436.

Second gear 436 has a structure similar to the structure of pulley 370 except that it has gear teeth 438 replacing the indentations 372. Thus, second gear 436 includes a round boss 439 that is off center from shaft 435 and is received in a hole of rotor 440. Rotor 440 also has circular holes 496 receiving pins 496A of output member 490.

Figure 11C:
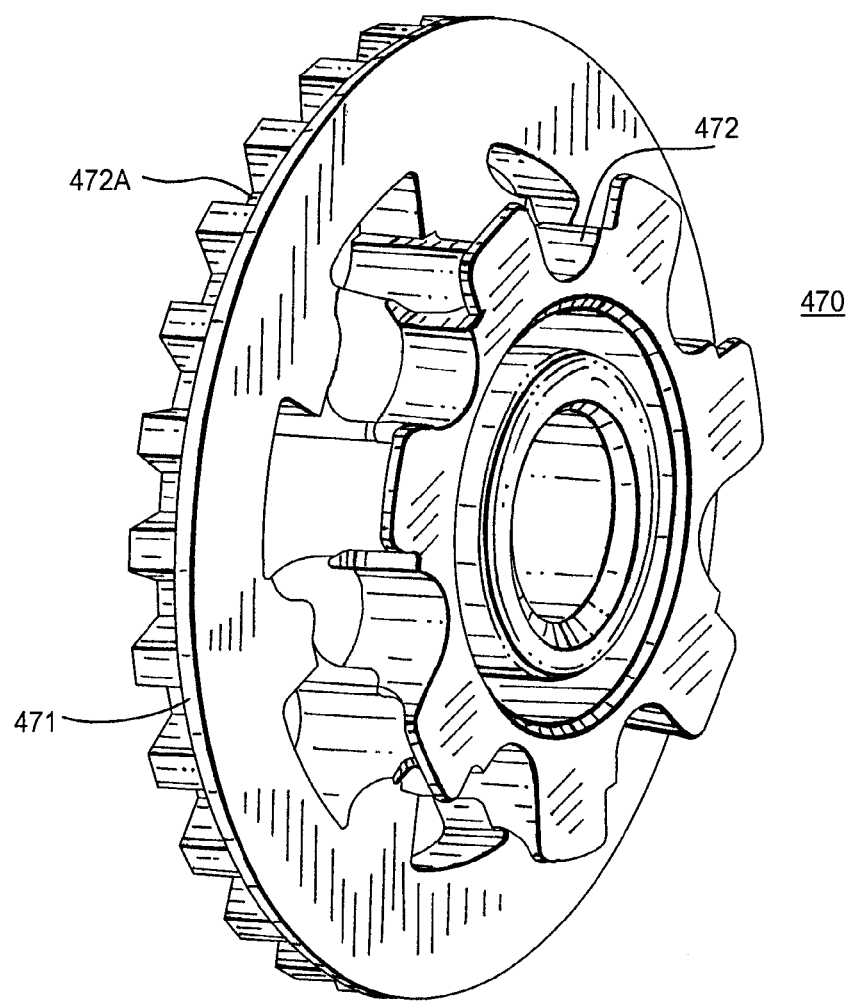
FIG. 11C shows an isometric view of the pulley for the apparatus of FIGS. 11A, 11B.

Pulley 470, shown in detail in FIG. 11C includes a central disc 471. On one side of the disc, a boss 473 is provided with a plurality of indentations 472 receiving the beads of a bead chain (not shown), On the other side of the disc there are a plurality of gear teeth 472A.

Once the drive 400 is assembled, a bead chain (not shown) is trained around pulley 470. Pulling the chain in either direction causes the pulley 470 to rotate in a respective direction. The rotation of the pulley 470 is transmitted through gear teeth 472A and 432 to first gear 430. First gear 430 in turn causes second gear 436 to turn. The number of gear teeth on pulley 470, gear 430 and gear 436 are selected to obtain a predetermined mechanical advantage, e.g., 4:1. The rotation of second gear 436 then causes the rotor 440 and the output member 490 to turn in a cycloid motion as described above. It should be appreciated that in all three drives described, any torque on the drum is resisted by the respective drives and is not transmitted back to the input member, e.g., the pulley. Accordingly, there is no need for springs or other brake mechanisms.

Numerous modifications may be made to this invention without departing from its scope as defined in the appended claims.

We claim:

1. A window treatment apparatus for operating a window treatment, said apparatus comprising:
    a base for supporting an end of the window treatment, said base being stationary during the operation of the window treatment;
    an input member selectively activated by a control member, said input member including a pulley;
    a rotor coupled to said input member;
    a gear disposed between said pulley and said rotor; and
    an output member connected to said window treatment for operating said window treatment when said input member is activated by the control member;
    wherein said rotor and said base cooperate to form a cycloidal drive that transmits rotational motion from said input member to said output member.

2. The apparatus of claim 1 wherein the control member is operable in a first mode to rotate said pulley in a first direction and in a second mode to rotate said pulley in a second direction, and wherein said cycloidal drive is adapted to rotate said output member in first and second directions, respectively.

3. The apparatus of claim 1 wherein said cycloidal drive resists torsional forces from said output member and does not transmit the same to said input member.

4. The apparatus of claim 1 further comprising a motion transmission element transmitting rotational motion of said pulley to said rotor.

5. The apparatus of claim 4 wherein said motion transmission element is a circular rib disposed in an off-center position with respect to a rotational axis of the pulley.

6. The apparatus of claim 1 wherein said base includes projections and said rotor includes motion control elements cooperating with said projections to impart a cycloidal motion to said rotor.

7. The apparatus of claim 6 wherein said base has m projections and said rotor has n control elements where m is larger than n, wherein n and m define the mechanical advantage of the cycloidal drive.

8. The apparatus of claim 1 wherein said output member is a drum, said pulley and said drum being coaxial.

9. The apparatus of claim 1 wherein said output member is a drum, said pulley and said drum having axially offset axes of rotation.

10. A window treatment apparatus for operating a window treatment, said apparatus comprising:
    a base for supporting an end of the window treatment, said base being stationary during the operation of the window treatment;
    an input member selectively activated by a control member, said input member including a pulley;
    a rotor coupled to said input member;
    a first gear coupled to said pulley;
    a second gear coupled between said first gear and said rotor; and
    an output member connected to said window treatment for operating said window treatment when said input member is activated by the control member;
    wherein said rotor and said base cooperate to form a cycloidal drive that transmits rotational motion from said input member to said output member.

11. A window treatment apparatus for operating a window treatment, said apparatus comprising:
    a base for supporting an end of the window treatment, said guard being stationary during the operation of the window treatment;
    an input member selectively activated by a control member;
    a rotor coupled to said input member; and
    an output member connected to said window treatment for operating said window treatment when said input member is activated by the control member;
    wherein said rotor and said base cooperate to form a cycloidal drive that transmits rotational motion form said input member to said output member; and
    wherein said input element is a pulley and said output member is a drum, said pulley and said drum having axially offset axes of rotation.

* * * * *